US009947484B2

(12) United States Patent
Takahashi

(10) Patent No.: US 9,947,484 B2
(45) Date of Patent: Apr. 17, 2018

(54) ELECTROLYTE SOLUTION AND ELECTROCHEMICAL DEVICE

(71) Applicant: DAIKIN INDUSTRIES, LTD., Osaka-Shi, Osaka (JP)

(72) Inventor: Kenzou Takahashi, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 194 days.

(21) Appl. No.: 14/899,348

(22) PCT Filed: Jun. 20, 2014

(86) PCT No.: PCT/JP2014/066478
§ 371 (c)(1),
(2) Date: Dec. 17, 2015

(87) PCT Pub. No.: WO2014/208474
PCT Pub. Date: Dec. 31, 2014

(65) Prior Publication Data
US 2016/0155577 A1    Jun. 2, 2016

(30) Foreign Application Priority Data

Jun. 26, 2013 (JP) ................................. 2013-134334
Jun. 26, 2013 (JP) ................................. 2013-134335

(51) Int. Cl.
*H01G 11/64* (2013.01)
*H01G 11/62* (2013.01)
*H01M 10/0567* (2010.01)
*H01M 10/0568* (2010.01)
*H01G 11/32* (2013.01)

(52) U.S. Cl.
CPC ............. *H01G 11/62* (2013.01); *H01G 11/32* (2013.01); *H01G 11/64* (2013.01); *H01M 10/0567* (2013.01); *H01M 10/0568* (2013.01); *Y02E 60/13* (2013.01); *Y02T 10/7022* (2013.01)

(58) Field of Classification Search
CPC ........ Y02E 60/13; H01G 11/60; H01G 11/62; H01G 11/32; H01G 11/64; H01M 10/0567; H01M 10/0568; H01M 10/0569
See application file for complete search history.

(56) References Cited

U.S. PATENT DOCUMENTS

| 5,754,393 | A | 5/1998 | Hiratsuka et al. | |
| 6,414,837 | B1* | 7/2002 | Sato | H01G 9/038 29/25.03 |
| 6,650,531 | B2* | 11/2003 | Ikeda | H01G 9/155 361/502 |
| 2002/0114126 | A1 | 8/2002 | Hirahara et al. | |
| 2004/0013946 | A1 | 1/2004 | Abe et al. | |
| 2004/0130852 | A1 | 7/2004 | Matsumoto et al. | |
| 2006/0024577 | A1* | 2/2006 | Schwake | H01G 9/038 429/188 |
| 2006/0035144 | A1 | 2/2006 | Shimizu et al. | |
| 2010/0035146 | A1* | 2/2010 | Fujii | H01M 10/0525 429/200 |
| 2011/0317330 | A1 | 12/2011 | Kim et al. | |
| 2012/0321913 | A1 | 12/2012 | Hua et al. | |
| 2014/0029165 | A1 | 1/2014 | Takahashi et al. | |

FOREIGN PATENT DOCUMENTS

| CN | 101447590 A | 6/2009 |
| JP | 8-306591 A | 11/1996 |
| JP | 2000-124077 A | 4/2000 |
| JP | 2000-311839 A | 11/2000 |
| JP | 2001-143750 A | 5/2001 |
| JP | 2002-33249 A | 1/2002 |
| JP | 2004-186246 A | 7/2004 |
| JP | 2006-73513 A | 3/2006 |
| JP | 2012-9805 A | 1/2012 |
| JP | 2012-134137 A | 7/2012 |
| JP | 2013-89390 A | 5/2013 |
| JP | 2013-520805 A | 6/2013 |

OTHER PUBLICATIONS

International Search Report for PCT/JP2014/066478 dated Sep. 22, 2014 [PCT/ISA/210].
International Preliminary Report on Patentability dated Dec. 29, 2015, issued by the International Bureau in corresponding International Application No. PCT/JP2014/066478.

* cited by examiner

Primary Examiner — C Melissa Koslow
(74) Attorney, Agent, or Firm — Sughrue Mion, PLLC

(57) ABSTRACT

An electrolyte solution intended for use in electrochemical devices which can achieve a high capacitance retention ratio even after long-term use at high voltage. The electrolyte solution of the present invention includes a mononitrile compound (I), at least one compound (II) selected from dinitrile compounds and trinitrile compounds, and a quaternary ammonium salt (III). The amount of the compound (II) in the electrolyte solution is 0.05 to 5% by mass.

10 Claims, No Drawings

1

ELECTROLYTE SOLUTION AND ELECTROCHEMICAL DEVICE

CROSS REFERENCE TO RELATED APPLICATIONS

This application is a National Stage of International Application No. PCT/JP2014/066478, filed on Jun. 20, 2014, which claims priority from Japanese Patent Application Nos. 2013-134334 and 2013-134335, both filed on Jun. 26, 2013, the contents of all of which are incorporated herein by reference in their entirety.

TECHNICAL FIELD

The present invention relates to an electrolyte solution and an electrochemical device comprising the electrolyte solution.

BACKGROUND ART

Electric double-layer capacitors, which enable rapid charging and discharging at a high current, have recently been put into practical use as electrochemical devices applicable to hybrid vehicles and electric vehicles.

Electric double-layer capacitors are provided with a polarizable electrode and an electrolyte solution, and driven on the principle that electric charges are stored in the electric double layer formed at the interface between the polarizable electrode and the electrolyte solution.

Electrolyte solutions often used in electrochemical devices such as electric double-layer capacitors are those obtained by dissolving a quaternary ammonium salt, for example, in an organic solvent such as a cyclic carbonate (e.g., propylene carbonate) or a nitrile compound (see Patent Literature 1).

For such electrolyte solutions, various methods are studied for improving the characteristics of electrochemical devices.

For example, in order to suppress degradation of withstand voltage and capacitance of electrochemical devices, the amounts of specific impurities in electrolyte solutions are reduced (for example, see Patent Literature documents 2 and 3). In order to improve the withstand voltage, a nonaqueous solvent is used including sulfolane or its derivative and a specific chain carbonate (for example, see Patent Literature 4). In order to improve the safety, an electrolyte solution is proposed including a specific electrolyte and a fluorine-containing organic solvent (for example, see Patent Literature 5).

The polarizable electrode of an electric double-layer capacitor is usually formed of activated carbon because of its large interface and excellent conductivity.

For example, Patent Literature 6 discloses an electrode comprising activated carbon for electric double-layer capacitors, the activated carbon being formed of a carbonized coconut shell and having a BET specific surface area of 2000 m²/g or larger and 2500 m²/g or smaller, an average pore size of 1.95 nm or greater and 2.20 nm or smaller, and a pore capacity of 0.05 cm³/g or greater and 0.15 cm³/g or smaller calculated by the Cranston-Inkley method among the pores having a diameter of 5.0 to 30.0 nm.

CITATION LIST

Patent Literature

Patent Literature 1: JP 2000-124077 A
Patent Literature 2: JP 2004-186246 A
Patent Literature 3: JP 2000-311839 A
Patent Literature 4: JP H08-306591 A
Patent Literature 5: JP 2001-143750 A
Patent Literature 6: JP 2002-33249 A

SUMMARY OF INVENTION

Technical Problem

As mentioned above, various techniques for improving the characteristics of electric double-layer capacitors have conventionally been known. Still, currently demanded is a technique of maintaining the characteristics of electrochemical devices at a high level even under a higher voltage.

The present invention is devised in consideration of the above state of the art, and aims to provide an electrolyte solution capable of providing electrochemical devices which achieve a high capacitance retention ratio even after long-term use at a high voltage.

Solution to Problem

The present inventor has found that an electrolyte solution containing a quaternary ammonium salt and at least two specific nitrile compounds allows an electrochemical device comprising this electrolyte solution to maintain a high capacitance retention ratio even after long-term use at a voltage as high as 3 V or higher. Thereby, the present inventor has completed the present invention.

Specifically, the present invention relates to an electrolyte solution comprising
a mononitrile compound (I),
at least one compound (II) selected from the group consisting of dinitrile compounds and trinitrile compounds, and
a quaternary ammonium salt (III),
the amount of the compound (II) in the electrolyte solution being 0.05 to 5% by mass.

The dinitrile compound is preferably a compound represented by the following formula (II-a):

$$NC-R^2-CN \tag{II-a}$$

wherein $R^2$ represents an alkylene group which may have a C1-C8 fluorine atom.

The mononitrile compound (I) is preferably at least one selected from the group consisting of acetonitrile and propionitrile.

The trinitrile compound is preferably a compound represented by the following formula (II-b):

$$NC-R^3-CX^1(CN)-R^4-CN \tag{II-b}$$

wherein $X^1$ represents a hydrogen atom or a fluorine atom, and $R^3$ and $R^4$ may be the same as or different from each other and individually represent an alkylene group having a C1-C5 fluorine atom.

The quaternary ammonium salt is preferably a tetraalkyl quaternary ammonium salt or a spirobipyrrolidinium salt.

The quaternary ammonium salt is preferably a spirobipyrrolidinium salt.

The amount of the quaternary ammonium salt is preferably 0.1 to 2.5 mol/L.

The electrolyte solution of the present invention is preferably intended for use in electrochemical devices.

The electrolyte solution of the present invention is preferably intended for use in electric double-layer capacitors.

The present invention also relates to an electrochemical device comprising the aforementioned electrolyte solution, a positive electrode, and a negative electrode.

The electrochemical device of the present invention is preferably an electric double-layer capacitor.

The electric double-layer capacitor preferably comprises a polarizable electrode containing activated carbon formed of a carbonized coconut shell.

Advantageous Effects of Invention

The present invention can provide an electrolyte solution and an electrochemical device which enable to maintain a high capacitance for a long time even after the use at a voltage as high as 3 V or higher.

DESCRIPTION OF EMBODIMENTS

The present invention relates to an electrolyte solution comprising a mononitrile compound (I), at least one compound (II) selected from the group consisting of dinitrile compounds and trinitrile compounds, and a quaternary ammonium salt (III), and the amount of the compound (II) is 0.05 to 5% by mass in the electrolyte solution.

Thus, electrochemical devices comprising the electrolyte solution of the present invention can maintain a high capacitance retention ratio even after long-term use at a high voltage.

Examples of the mononitrile compound (I) include a mononitrile compound represented by the formula (I):

$$R^1\text{—}(CN)_n \tag{I}$$

wherein $R^1$ represents a C1-C10 alkyl group and n is an integer of 1.

When n is 1 in the formula (I), $R^1$ is a C1-C10 alkyl group.

Examples of the alkyl group include C1-C10 alkyl groups such as a methyl group, an ethyl group, a propyl group, an isopropyl group, a butyl group, an isobutyl group, a tert-butyl group, a pentyl group, a neopentyl group, a hexyl group, a heptyl group, an octyl group, a nonyl group, and a decyl group. Preferable among these are a methyl group and an ethyl group.

In order to achieve a low resistance, the mononitrile compound is preferably at least one selected from the group consisting of acetonitrile ($CH_3$—CN) and propionitrile ($CH_3$—$CH_2$—CN).

The amount of the mononitrile compound (I) is preferably 40 to 95% by mass in the electrolyte solution. The amount of the mononitrile compound is more preferably 45% by mass or more, still more preferably 50% by mass or more, whereas it is more preferably 90% by mass or less, still more preferably 85% by mass or less.

The electrolyte solution of the present invention comprises at least one compound (II) selected from the group consisting of dinitrile compounds and trinitrile compounds.

Combination use of the mononitrile compound (I) and the compound (II) allows an electrochemical device comprising the electrolyte solution of the present invention to have a higher capacitance retention ratio even after long-term use at a high voltage.

The dinitrile compounds are each preferably a compound represented by the formula (II-a):

$$NC\text{—}R^2\text{—}CN \tag{II-a}$$

wherein $R^2$ represents a C1-C8 alkylene group which may have a fluorine atom.

In the dinitrile compound represented by the formula (II-a), $R^2$ represents a C1-C8 alkylene group which may have a fluorine atom. The carbon number of the alkylene group is preferably 1 to 3.

$R^2$ is preferably a C1-C8 alkylene group or a C1-C7 fluoroalkylene group. The fluoroalkylene group is an alkylene group in which part or all of the hydrogen atoms are replaced by fluorine atoms.

$R^2$ is more preferably a C1-C7 alkylene group or a C1-C5 fluoroalkylene group, still more preferably a C1-C3 alkylene group.

In order to maintain a high output, $R^2$ is specifically preferably —$CH_2$—$CH_2$—, —$CH_2$—$CH_2$—$CH_2$—, or —$CH_2$—$CH_2$—$CH_2$—$CH_2$—.

The dinitrile compound is preferably at least one selected from the group consisting of succinonitrile, glutaronitrile, and adiponitrile. In order to maintain a high output, at least one selected from the group consisting of succinonitrile and adiponitrile is more preferred.

The trinitrile compounds are each preferably a compound represented by the formula (II-b):

$$NC\text{—}R^3\text{—}CX^1(CN)\text{—}R^4\text{—}CN \tag{II-b}$$

wherein $X^1$ represents a hydrogen atom or a fluorine atom; and $R^3$ and $R^4$ may be the same as or different from each other and individually represent a C1-C5 alkylene group which may have a fluorine atom.

In the trinitrile compound represented by the formula (II-b), $X^1$ represents a hydrogen atom or a fluorine atom.

$R^3$ and $R^4$ may be the same as or different from each other, and individually represent a C1-C5 alkylene group which may have a fluorine atom. The carbon number of the alkylene group is preferably 1 to 3.

$R^3$ and $R^4$ are each preferably a C1-C5 alkylene group or a C1-C4 fluoroalkylene group. The fluoroalkylene group is an alkylene group in which part or all of the hydrogen atoms are replaced by fluorine atoms.

$R^3$ and $R^4$ are each more preferably a C1-C3 alkylene group.

In order to maintain a high output, $R^3$ and $R^4$ are each specifically still more preferably a C2 alkylene group.

The trinitrile compound is more preferably 4-cyanopentanedinitrile.

The amount of the compound (II) is 0.05 to 5% by mass in the electrolyte solution. If the amount thereof is within the above range, the capacitance retention ratio can be maintained high.

The amount thereof in the electrolyte solution is preferably 0.1% by mass or more, more preferably 0.2% by mass or more, whereas it is preferably 4% by mass or less, more preferably 3% by mass or less.

Examples of the quaternary ammonium salt (III) include tetraalkyl quaternary ammonium salts (IIIA), spirobipyrrolidinium salts (IIIB), imidazolium salts (IIIC), N-alkylpyridinium salts (IIID), and N,N-dialkylpyrrolidinium salts (IIIE).

Examples of the tetraalkyl quaternary ammonium salts (IIIA) include those represented by the formula (IIIA):

[Chem. 1]

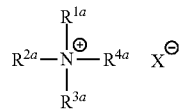

wherein $R^{1a}$, $R^{2a}$, $R^{3a}$, and $R^{4a}$ may be the same as or different from each other, and individually represent a C1-C6 alkyl group which may have an ether bond; and $X^-$ represents an anion. Further, salts derived from these ammonium salts in which part or all of the hydrogen atoms therein are replaced by fluorine atoms and/or C1-C4 fluorine-containing alkyl groups are also preferred because they can improve the oxidation resistance.

Specific examples thereof include:

tetraalkyl quaternary ammonium salts represented by the formula (IIIA-1):

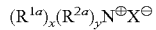
[Chem. 2]

wherein $R^{1a}$, $R^{2a}$, and $X^-$ each are defined as in the formula (IIIA); and x and y may be the same as or different from each other and individually represent an integer of 0 to 4, and x+y=4; and alkyl ether group-containing trialkyl ammonium salts represented by the formula (IIIA-2):

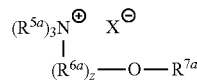
[Chem. 3]

wherein $R^{5a}$ represents a C1-C6 alkyl group; $R^{6a}$ represents a C1-C6 divalent hydrocarbon group; $R^{7a}$ represents a C1-C4 alkyl group; z represents 1 or 2; and $X^-$ represents an anion. Introduction of an alkyl ether group enables to reduce the viscosity.

The anion $X^-$ may be an inorganic anion or may be an organic anion. Examples of the inorganic anion include $AlCl_4^-$, $BF_4^-$, $PF_6^-$, $AsF_6^-$, $TaF_6^-$, $I^-$, and $SbF_6^-$. Examples of the organic anion include $CF_3COO^-$, $CF_3SO_3^-$, $(CF_3SO_2)_2N^-$, and $(C_2F_5SO_2)_2N^-$.

In order to achieve good oxidation resistance and ionic dissociation, $BF_4^-$, $PF_6^-$, $AsF_6^-$, and $SbF_6^-$ are preferred.

Specific, preferable examples of the tetraalkyl quaternary ammonium salt (IIIA) include $Et_4NBF_4$, $Et_4NClO_4$, $Et_4NPF_6$, $Et_4NAsF_6$, $Et_4NSbF_6$, $Et_4NCF_3SO_3$, $Et_4N(CF_3SO_2)_2N$, $Et_4NC_4F_9SO_3$, $Et_3MeNBF_4$, $Et_3MeNClO_4$, $Et_3MeNPF_6$, $Et_3MeNAsF_6$, $Et_3MeNSbF_6$, $Et_3MeNCF_3SO_3$, $Et_3MeN(CF_3SO_2)_2N$, and $Et_3MeNC_4FSO_3$. Particularly preferred are $Et_4NBF_4$, $Et_4NPF_6$, $Et_4NSbF_6$, $Et_4NAsF_6$, $Et_3MeNBF_4$, and an N,N-diethyl-N-methyl-N-(2-methoxyethyl)ammonium salt.

Examples of the spirobipyrrolidinium salts (IIIB) include compounds represented by the formula (IIIB):

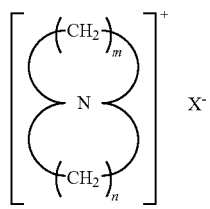
[Chem. 4]

wherein m and n individually represent an integer of 3 to 7 which may be the same as or different from each other, and $X^-$ represents an anion.

In the formula, m and n individually represent an integer of 3 to 7 which may be the same as or different from each other. In order to achieve good solubility of the salt, they each are more preferably an integer of 4 or 5.

$X^-$ in the formula represents an anion. Specifically, preferable examples of the anion $X^-$ include the same as those for the salts (IIIA).

In order to achieve good solubility of the salt, the spirobipyrrolidinium salt is specifically preferably the following.

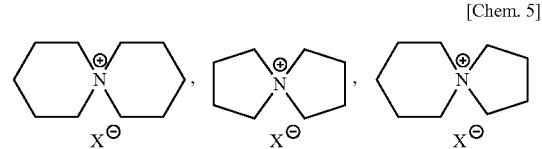
[Chem. 5]

wherein $X^-$ represents $BF_4^-$ or $PF_6^-$.

Preferable examples of the imidazolium salts (IIIC) include imidazolium salts represented by the formula (IIIC):

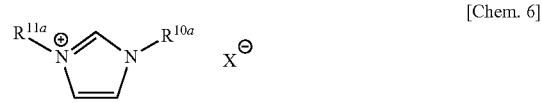
[Chem. 6]

wherein $R^{10a}$ and $R^{11a}$ may be the same as or different from each other and individually represent a C1-C6 alkyl group, and $X^-$ represents an anion.

Further, salts derived from these imidazolium salts in which part or all of the hydrogen atoms therein are replaced by fluorine atoms and/or C1-C4 fluorine-containing alkyl groups are also preferred because they can improve the oxidation resistance.

Specific, preferable examples of the anion $X^-$ include the same as those mentioned for the salts (IIIA).

Specific, preferable examples thereof include those represented by the following formula.

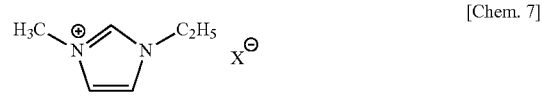
[Chem. 7]

Such an imidazolium salt is excellent in that it has a low viscosity and good solubility.

Preferable examples of the N-alkylpyridinium salts (IIID) include N-alkylpyridinium salts represented by the formula (IIID):

[Chem. 8]

wherein $R^{12a}$ represents a C1-C6 alkyl group, and $X^-$ represents an anion.

Further, salts derived from these N-alkylpyridinium salts in which part or all of the hydrogen atoms therein are replaced by fluorine atoms and/or C1-C4 fluorine-containing alkyl groups are also preferred because they can improve the oxidation resistance.

Specific, preferable examples of the anion $X^-$ include the same as those mentioned for the salts (IIIA).

Specific, preferable examples thereof include those represented by the following formulas.

[Chem. 9]

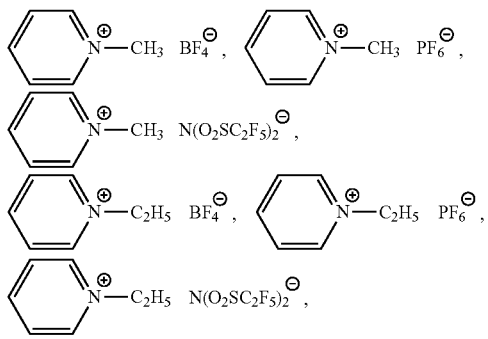

These N-alkylpyridinium salts are excellent in that they have a low viscosity and good solubility.

Preferable examples of the N,N-dialkylpyrrolidinium salts (IIIE) include N,N-dialkylpyrrolidinium salts represented by the formula (IIIE):

[Chem. 10]

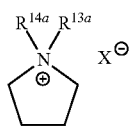

wherein $R^{13a}$ and $R^{14a}$ may be the same as or different from each other and individually represent a C1-C6 alkyl group; and $X^-$ represents an anion. Further, salts derived from these N,N-dialkylpyrrolidinium salts in which part or all of the hydrogen atoms therein are replaced by fluorine atoms and/or C1-C4 fluorine-containing alkyl groups are also preferred because they can improve the oxidation resistance.

Specific, preferable examples of the anion $X^-$ include the same as those mentioned for the salts (IIIA).

Specific, preferable examples thereof include those represented by the following formulas.

[Chem. 11]

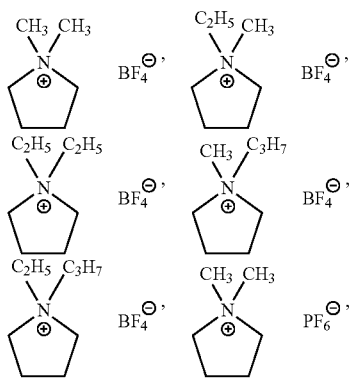

-continued

[Chem. 12]

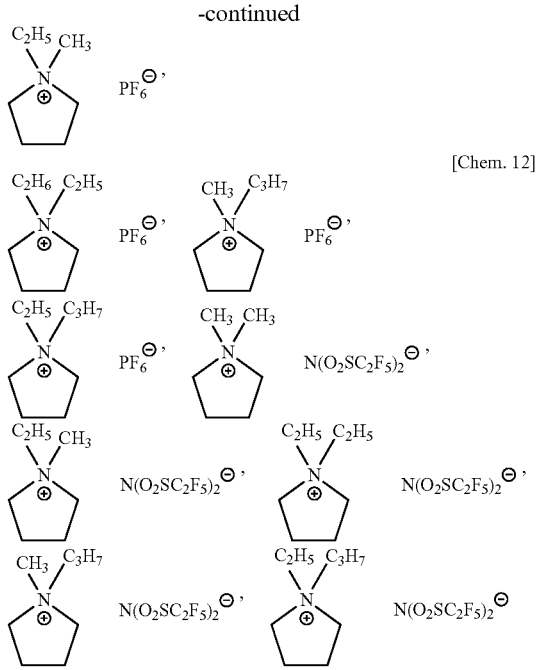

These N,N-dialkylpyrrolidinium salts are excellent in that they have a low viscosity and good solubility.

Preferred among these quaternary ammonium salts are the salts (IIIA), (IIIB), and (IIIC) because they have good solubility, oxidation resistance, and ion conductivity. More preferred are those represented by the following formulas:

[Chem. 13]

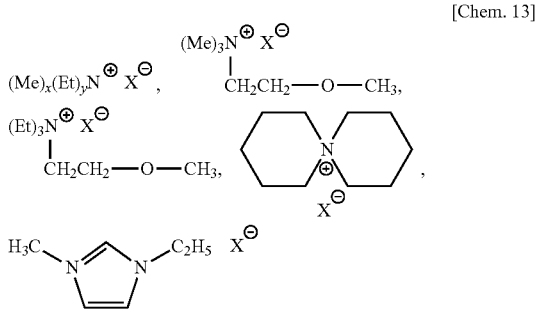

wherein Me represents a methyl group; Et represents an ethyl group; and $X^-$, x, and y are the same as those mentioned in the formula (IIIA-1).

The quaternary ammonium salt (III) is more preferably a tetraalkyl quaternary ammonium salt or a spirobipyrrolidinium salt.

The quaternary ammonium salt (III) is still more preferably spirobipyrrolidinium tetrafluoroborate, piperidine spiropyrrolidinium tetrafluoroborate, triethyl methyl ammonium tetrafluoroborate, or tetraethyl ammonium tetrafluoroborate.

The concentration of the quaternary ammonium salt (III) in the electrolyte solution is preferably 0.1 to 2.5 mol/l, though it depends on the required current density, the application, the type of the quaternary ammonium salt, and the like. The concentration is more preferably 0.5 to 2.5 mol/l, still more preferably 1.0 to 2.5 mol/l.

The electrolyte solution of the present invention preferably further comprises a sulfolane compound. A sulfolane compound allows the electrochemical device of the present invention to have better durability under a high voltage.

The sulfolane compound may be a fluorine-free sulfolane compound or may be a fluorine-containing sulfolane compound.

Examples of the fluorine-free sulfolane compound include, in addition to sulfolane, fluorine-free sulfolane derivatives represented by the following formula:

[Chem. 14]

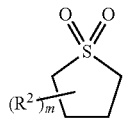

wherein $R^2$ represents a C1-C4 alkyl group, and m represents an integer of 1 or 2.

Preferred are the following sulfolane and sulfolane derivatives.

[Chem. 15]

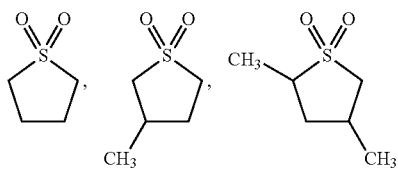

Examples of the fluorine-containing sulfolane compound include the fluorine-containing sulfolane compounds disclosed in JP 2003-132944 A. Preferred are those represented by the following formulas.

[Chem. 16]

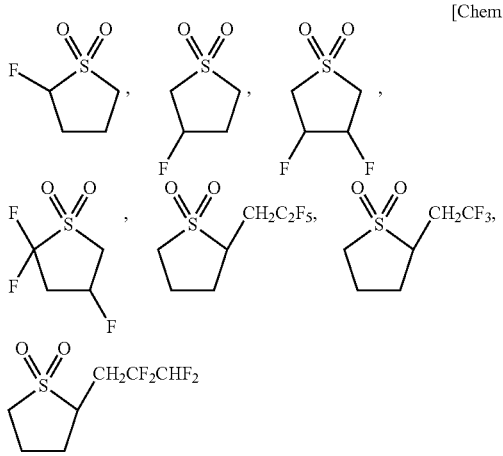

Preferred as the above sulfolane compound are sulfolane, 3-methylsulfolane, and 2,4-dimethylsulfolane, and particularly preferred are 3-methyl sulfolane and sulfolane.

The electrolyte solution of the present invention may further contain a fluorine-containing ether.

Examples of the fluorine-containing ether include fluorine-containing chain ethers and fluorine-containing cyclic ethers.

Examples of the fluorine-containing chain ethers include compounds disclosed in JP H08-37024 A, JP H09-97627 A, JP H11-26015 A, JP 2000-294281 A, JP 2001-52737 A, and JP H11-307123 A.

Preferred as the fluorine-containing chain ethers are fluorine-containing chain ethers represented by the formula (IV):

$$Rf^1—O—Rf^2 \quad (IV)$$

wherein $Rf^1$ represents a C1-C10 fluoroalkyl group, and $Rf^2$ represents a C1-C4 alkyl group which may have a fluorine atom.

In the formula (IV), $Rf^2$ is preferably a fluorine-containing alkyl group because such a chain fluorine-containing ether not only is particularly better in oxidation resistance and compatibility with electrolyte salts, but also has a higher decomposition voltage and a lower freezing point that enables to maintain the low-temperature characteristics in comparison with the cases where $Rf^2$ is a fluorine-free alkyl group.

Examples of the group for $Rf^1$ include C1-C10 fluoroalkyl groups such as $HCF_2CF_2CH_2—$, $HCF_2CF_2CF_2CH_2—$, $HCF_2CF_2CF_2CF_2CH_2—$, $C_2F_5CH_2—$, $CF_3CFHCF_2CH_2—$, $HCF_2CF(CF_3)CH_2—$, $C_2F_5CH_2CH_2—$, and $CF_3CH_2CH_2—$. Preferred are C3-C6 fluoroalkyl groups.

Examples of the group for $Rf^2$ include fluorine-free C1-C4 alkyl groups, $—CF_2CF_2H$, $—CF_2CFHCF_3$, $—CF_2CF_2CF_2H$, $—CH_2CH_2CF_3$, $—CH_2CFHCF_3$, and $—CH_2CH_2C_2F_5$. Preferred are fluorine-containing C2-C4 alkyl groups.

Particularly preferably, in order to achieve good ion conductivity, $Rf^1$ is a fluorine-containing C3-C4 alkyl group and $Rf^2$ is a fluorine-containing C2-C3 alkyl group.

Specifically, the fluorine-containing chain ether may comprise one or two or more of $HCF_2CF_2CH_2OCF_2CF_2H$, $CF_3CF_2CH_2OCF_2CF_2H$, $HCF_2CF_2CH_2OCF_2CFHCF_3$, $CF_3CF_2CH_2OCF_2CFHCF_3$, $HCF_2CF_2CH_2OCH_2CFHCF_3$, and $CF_3CF_2CH_2OCH_2CFHCF_3$. In order to achieve a high decomposition voltage and to maintain low-temperature characteristics, $HCF_2CF_2CH_2OCF_2CF_2H$, $HCF_2CF_2CH_2OCF_2CFHCF_3$, $CF_3CF_2CH_2OCF_2CFHCF_3$, and $CF_3CF_2CH_2OCF_2CF_2H$ are particularly preferred.

For the fluorine-containing cyclic ether, those represented by the following formulas:

[Chem. 17]

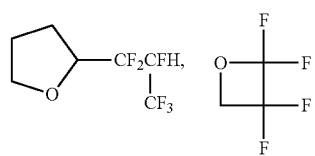

may be mentioned as examples thereof.

The electrolyte solution of the present invention may further contain another solvent such as a cyclic carbonate or a chain carbonate, if needed.

The cyclic carbonate may be a fluorine-free cyclic carbonate or may be a fluorine-containing cyclic carbonate.

Examples of the fluorine-free cyclic carbonate include ethylene carbonate (EC), propylene carbonate (PC), and vinylene carbonate. In order to reduce the internal resistance and to maintain the low-temperature characteristics, propylene carbonate (PC) is preferred.

Examples of the fluorine-containing cyclic carbonate include mono-, di-, tri-, or tetra-fluoroethylene carbonates and trifluoromethyl ethylene carbonate. In order to improve the withstand voltage of the resulting electrochemical device, trifluoromethyl ethylene carbonate is preferred.

The chain carbonate may be a fluorine-free chain carbonate or a fluorine-containing chain carbonate.

Examples of the fluorine-free chain carbonate include dimethyl carbonate (DMC), diethyl carbonate (DEC), ethyl methyl carbonate (EMC), methyl isopropyl carbonate (MIPC), ethyl isopropyl carbonate (EIPC), and 2,2,2-trifluoroethyl methyl carbonate (TFEMC). In order to reduce the internal resistance and to maintain the low-temperature characteristics, dimethyl carbonate (DMC) is preferred.

Examples of the fluorine-containing chain carbonate include:

fluorine-containing chain carbonates represented by the following formula (V-1):

[Chem. 18]

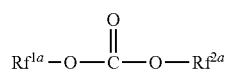

wherein $Rf^{1a}$ represents an alkyl group or a fluoroalkyl group having a moiety represented by the following formula:

[Chem. 19]

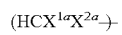

(wherein $X^{1a}$ and $X^{2a}$ may be the same as or different from each other and individually represent a hydrogen atom or a fluorine atom) at an end and having a fluorine content of 10 to 76% by mass, preferably a C1-C3 alkyl group; and $Rf^{2a}$ represents a fluoroalkyl group having a moiety represented by the above formula or $CF_3$ at an end and having a fluorine content of 10 to 76% by mass;

fluorine-containing chain carbonates represented by the following formula (V-2):

[Chem. 20]

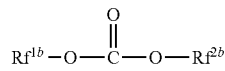

wherein $Rf^{1b}$ represents a fluorine-containing alkyl group having an ether bond, $-CF_3$ at an end, and having a fluorine content of 10 to 76% by mass; and $Rf^{2b}$ represents a fluorine-containing alkyl group having an ether bond or a fluorine-containing alkyl group, each of which has a fluorine content of 10 to 76% by mass; and fluorine-containing chain carbonates represented by the following formula (V-3):

[Chem. 21]

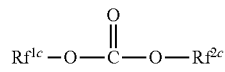

wherein $Rf^{1c}$ represents a fluorine-containing alkyl group having an ether bond, a moiety represented by $HCFX^{1c}-$ (wherein $X^{1c}$ represents a hydrogen atom or a fluorine atom) at an end, and having a fluorine content of 10 to 76% by mass; and $R^{2c}$ represents an alkyl group in which a hydrogen atom may be replaced by a halogen atom and which may have a hetero atom in the chain.

Specific examples of usable fluorine-containing chain carbonates include chain carbonates having fluorine-containing groups, represented by the following formula (V-4):

[Chem. 22]

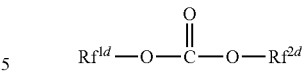

wherein $Rf^{1d}$ and $Rf^{2d}$ each represent $H(CF_2)_2CH_2-$, $FCH_2CF_2CH_2-$, $H(CF_2)_2CH_2CH_2-$, $CF_3CF_2CH_2-$, $CF_3CH_2CH_2-$, $CF_3CF(CF_3)CH_2CH_2-$, $C_3F_7OCF(CF_3)CH_2-$, $CF_3OCF(CF_3)CH_2-$, $CF_3OCF_2-$, or the like.

In order to reduce the internal resistance and to maintain the low-temperature characteristics, the fluorine-containing chain carbonate is preferably any of the following.

[Chem. 23]

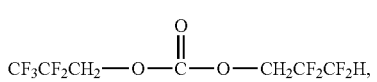
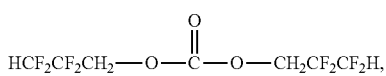
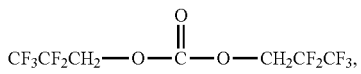
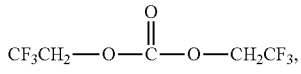
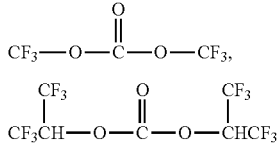

In addition, the following may also be used as the fluorine-containing chain carbonate.

[Chem. 24]

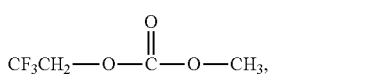
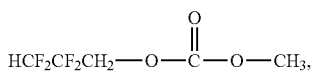
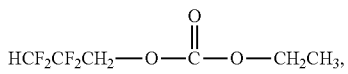
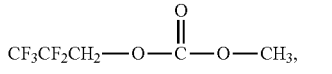
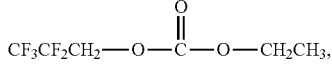
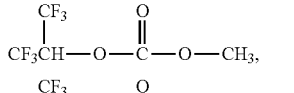

Examples of other solvents to be mixed with the above electrolyte solution include fluorine-free lactones and fluorine-containing lactones represented by the following formulas:

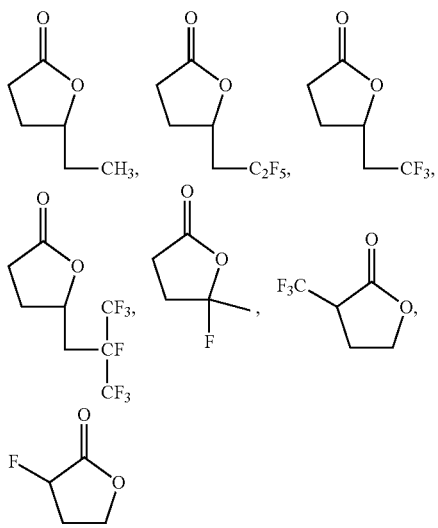

furans, and oxolanes.

In the cases where the electrolyte solution of the present invention contains a solvent other than the nitrile compound, the amount of such an additional solvent in the electrolyte solution is preferably less than 50% by volume, more preferably less than 40% by volume, still more preferably less than 30% by volume.

In the cases where the sulfolane compound is added to the electrolyte solution of the present invention, the amount of the sulfolane compound in the electrolyte solution is preferably less than 50% by volume, more preferably less than 40% by volume, still more preferably less than 30% by volume, particularly preferably less than 20% by volume. The amount of the sulfolane compound in the electrolyte solution is preferably 1% by volume or more, more preferably 5% by volume or more. The sulfolane compound is preferably added in an amount within the above range in that it can improve the long-term reliability.

In the cases where the fluorine-containing ether is added to the electrolyte solution of the present invention, the volume ratio between the fluorine-containing ether and the nitrile compound is preferably 90/10 to 1/99, more preferably 40/60 to 1/99, still more preferably 30/70 to 1/99. If the volume ratio falls within this range, the withstand voltage can be maintained and the effect of reducing the internal resistance can be improved.

The electrolyte solution of the present invention may further contain another electrolyte salt in addition to the quaternary ammonium salt.

Such an additional electrolyte salt may be a lithium salt. Preferable examples of the lithium salt include $LiPF_6$, $LiBF_4$, $LiAsF_6$, $LiSbF_6$, and $LiN(SO_2C_2H_5)_2$.

Another quaternary ammonium salt may be used. Preferable examples of such an additional quaternary ammonium salt include $TEMABF_4$ and $TEABF_4$.

In order to further improve the capacitance, a magnesium salt may be used. Preferable examples of the magnesium salt include $Mg(ClO_4)_2$ and $Mg(OOC_2H_5)_2$.

The electrolyte solution of the present invention is prepared by mixing the quaternary ammonium salt (III) with the mononitrile compound (I) and the compound (II), and optionally other components, to dissolve the salt (III). Mixing and dissolution can be performed by conventionally known methods.

Further, the electrolyte solution of the present invention may be a gel electrolyte solution gelled (plasticized) in combination with a polymer material that can be dissolved in or swelled by the nitrile compound.

Examples of such a polymer material include conventionally known polyethylene oxide and polypropylene oxide, and modified products thereof (JP H08-222270 A, JP 2002-100405 A); polyacrylate-based polymers, polyacrylonitrile, and fluororesins such as polyvinylidene fluoride and vinylidene fluoride-hexafluoropropylene copolymers (JP H04-506726 T, JP H08-507407 T, JP H10-294131 A); and complexes of any of such fluororesins and any of hydrocarbon resins (JP H11-35765 A, JP H11-86630 A). In particular, polyvinylidene fluoride or a vinylidene fluoride-hexafluoropropylene copolymer is preferably used as a polymer material for a gel electrolyte solution.

In addition, ion-conducting compounds disclosed in JP 2006-114401 A may also be used.

These ion-conducting compounds are amorphous fluorine-containing polyether compounds each of which has a fluorine-containing group in a side chain and represented by the following formula (1-1):

$$P\text{-}(D)\text{-}Q \tag{1-1}$$

wherein D represents a unit represented by the following formula (2-1):

$$\text{-}(D1)_n\text{-}(FAE)_m\text{-}(AE)_p\text{-}(Y)_q\text{-} \tag{2-1}$$

wherein

D1 represents an ether unit which has a fluorine-containing organic group having an ether bond in a side chain and which is represented by the following formula (2a):

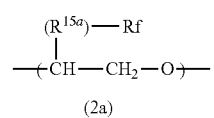

(2a)

wherein Rf represents a fluorine-containing organic group which has an ether bond and which may have a crosslinkable functional group, and $R^{15a}$ represents a group or an atomic bond that couples Rf with the main chain, FAE represents an ether unit which has a fluorine-containing alkyl group in a side chain and which is represented by the following formula (2b):

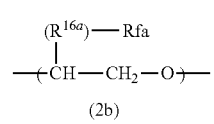

(2b)

wherein Rfa represents a hydrogen atom or a fluorine-containing alkyl group which may have a crosslinkable functional group, and $R^{16a}$ represents a group or an atomic bond that couples Rfa with the main chain, AE represents an ether unit represented by the formula (2c):

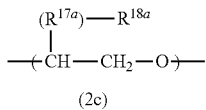

(2c)

wherein $R^{18a}$ represents a hydrogen atom, an alkyl group which may have a crosslinkable functional group, an alicyclic hydrocarbon group which may have a crosslinkable functional group, or an aromatic hydrocarbon group which may have a crosslinkable functional group, and $R^{17a}$ is a group or an atomic bond that couples $R^{18a}$ with the main chain, Y represents a unit comprising at least one of the units represented by the following formulas (2d-1) to (2d-3),

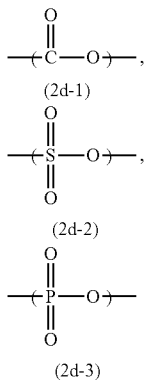

n represents an integer of 0 to 200;
m represents an integer of 0 to 200;
p represents an integer of 0 to 10000; and
q represents an integer of 1 to 100,
where n+m is not 0 and the order of bonding of D1, FAE, AE, and Y is not specified; and P and Q may be the same as or different from each other, and individually represent a hydrogen atom, an alkyl group which may have a fluorine atom and/or a crosslinkable functional group, a phenyl group which may have a fluorine atom and/or a crosslinkable functional group, a —COOH group, —$OR^{19a}$ (wherein $R^{19a}$ represents a hydrogen atom or an alkyl group which may have a fluorine atom and/or a crosslinkable functional group), an ester group, or a carbonate group (if a terminal of D is an oxygen atom, neither P nor Q is a —COOH group, —$OR^{19a}$, an ester group, or a carbonate group).

The electrolyte solution of the present invention may contain another additive, if needed. Examples of such an additive include metal oxides and glass. These may be used to the extent that they do not impair the effects of the present invention.

Preferably, the electrolyte solution of the present invention does not freeze or the electrolyte salt does not precipitate at low temperature (e.g., 0° C., −20° C.). Specifically, the viscosity at 0° C. is preferably 100 mPa·s or lower, more preferably 30 mPa·s or lower, particularly preferably 15 mPa·s or lower. Further, specifically, the viscosity at −20° C. is preferably 100 mPa·s or lower, more preferably 40 mPa·s or lower, particularly preferably 15 mPa·s or lower.

The electrolyte solution of the present invention is preferably a nonaqueous electrolyte solution.

The electrolyte solution of the present invention is useful as an electrolyte solution of various electrochemical devices comprising an electrolyte solution. Examples of the electrochemical devices include electric double-layer capacitors, lithium secondary batteries, radical batteries, solar cells (especially, dye sensitized solar cells), fuel cells, various electrochemical sensors, electrochromic elements, electrochemical switching elements, aluminum electrolytic capacitors, and tantalum electrolytic capacitors. In particular, the electrolyte solution of the present invention is suited for electric double-layer capacitors and lithium secondary batteries, more suited for electric double-layer capacitors. Moreover, the electrolyte solution of the present invention is also usable as an ion conductor of antistatic coating materials.

As mentioned above, the electrolyte solution of the present invention is preferably used for electrochemical devices, particularly preferably for electric double-layer capacitors.

An electrochemical device comprising the electrolyte solution of the present invention, a positive electrode, and a negative electrode is also one aspect of the present invention. Examples of the electrochemical device include those mentioned above, and an electric double-layer capacitor is particularly preferred.

The following will describe in detail a case where the electrochemical device of the present invention is an electric double-layer capacitor.

In the electric double-layer capacitor, at least one of the positive electrode or the negative electrode is preferably a polarizable electrode. The polarizable electrode and a non-polarizable electrode may be the following electrodes specifically disclosed in JP H09-7896 A.

The polarizable electrode may be a polarizable electrode mainly comprising activated carbon, and it preferably contains inactive carbon having a large specific surface area and a conducting agent (e.g., carbon black) which imparts electronic conductivity. The polarizable electrode can be formed by various methods. For example, a polarizable electrode comprising activated carbon and carbon black can be formed by mixing activated carbon powder, carbon black, and a phenolic resin, press-molding the mixture, and then firing and activating the mixture in an inert gas atmosphere and in a steam atmosphere. This polarizable electrode is preferably bonded with a current collector using, for example, a conductive adhesive.

Alternatively, a polarizable electrode may be formed by kneading activated carbon powder, carbon black, and a binder in the presence of an alcohol to form a sheet-shaped mixture, and then drying the sheet-shaped mixture. This binder may be polytetrafluoroethylene, for example. Alternatively, a polarizable electrode integrated with a current collector may be formed by mixing activated carbon powder, a conductive agent (e.g., carbon black), a binder, and a solvent to form slurry, applying this slurry to a metal foil of a current collector, and drying the applied slurry.

Both electrodes of the electric double-layer capacitor may be a polarizable electrode mainly comprising activated carbon. Further, the electric double-layer capacitor may have a structure in which one electrode thereof is a non-polarizable electrode. Examples of such a structure include a structure in which a positive electrode mainly comprises a cell active material such as a metal oxide and a negative electrode is a polarizable electrode mainly comprising activated carbon;

and a structure in which a negative electrode comprises metallic lithium or a lithium alloy and a polarizable electrode mainly comprises activated carbon.

In place of or in combination with activated carbon, a carbonaceous material may be used such as carbon black, graphite, expanded graphite, porous carbon, carbon nanotube, carbon nanohorn, and ketjen black.

The solvent to be used for preparation of slurry in the production of an electrode is preferably one that dissolves a binder. The solvent is appropriately selected from N-methylpyrrolidone, dimethylformamide, toluene, xylene, isophorone, methyl ethyl ketone, ethyl acetate, methyl acetate, dimethyl phthalate, ethanol, methanol, butanol, and water in accordance with the type of the binder.

Examples of the activated carbon to be used for polarizable electrodes include phenol resin-based activated carbon, coconut shell-based activated carbon, and petroleum coke-based activated carbon. In order to achieve a large capacitance, coconut shell-based activated carbon is preferred. Further, examples of a method for activating activated carbon include a steam activation method and a molten KOH activation method. In order to achieve a larger capacitance, the use of activated carbon activated by steam activation method is preferred.

The electric double-layer capacitor preferably comprises an electrode formed from activated carbon which is formed of a carbonized coconut shell.

The activated carbon obtained by carbonizing a coconut shell can be obtained by carbonizing a coconut shell and then activating the carbonized coconut shell.

A coconut shell may be carbonized by any methods, including generally known methods.

Examples of activation methods include gas activation and chemical activation.

The gas activation is a method of generating activated carbon by bringing a carbonized material into contact with steam, carbon dioxide, oxygen, or other oxidized gas at high temperature.

The chemical activation is a method of generating activated carbon by impregnating a material with an activator and heating the workpiece in an inert gas atmosphere so that activated carbon is generated due to dehydration and oxidation reactions of the activator. Examples of the activator include zinc chloride, phosphoric acid, sodium phosphate, calcium chloride, potassium sulfide, potassium hydroxide, sodium hydroxide, potassium carbonate, sodium carbonate, sodium sulfate, potassium sulfate, and calcium carbonate.

In order to provide activated carbon with excellent durability, the activation method is preferably steam activation.

Specific examples of methods of preparing activated carbon by carbonizing a coconut shell include a method in which a coconut shell is pulverized and the sizes of the pulverized pieces are adjusted, the pulverized coconut shell is carbonized in an inert gas atmosphere to provide a coconut shell char, and then the resulting coconut shell char is heated at 800° C. to 1300° C. in an inert gas such as nitrogen or argon containing 30% by volume or higher but 100% by volume or lower of a steam atmosphere.

The coconut shell before activation, coconut shell char, and activated carbon obtained by activation may be washed in an acid aqueous solution such as hydrochloric acid, nitric acid, or sulfuric acid so that the metal impurities and ashes contained in the carbon are removed.

The activated carbon obtained by carbonizing a coconut shell may have any shape such as a pulverized form, particles, granules, fibers, felt, a textile, or a sheet.

In the cases of activated carbon particles, the average particle size thereof is preferably 30 μm or smaller, more preferably 7 to 20 μm, in order to improve the electrode bulk density and to reduce the internal resistance.

The activated carbon obtained by carbonizing a coconut shell preferably has a specific surface area of 1500 to 2500 $m^2/g$. If the specific surface area falls within the above range, a sufficient capacitance can be achieved and activated carbon can inexpensively be produced.

The specific surface area is more preferably 1600 $m^2/g$ or larger and 2100 $m^2/g$ or smaller.

The specific surface area is a value determined by the BET method.

The activated carbon obtained by carbonizing a coconut shell preferably has an oxygen concentration of 100 mg or lower per gram of the activated carbon. The oxygen concentration within the above range can suppress generation of gas inside the resulting cell.

An electrode mainly comprising the activated carbon can be formed by any method, including known methods. For example, a polarizable electrode comprising the activated carbon and carbon black can be produced by mixing powder of the activated carbon, carbon black, and phenolic resin, press-molding the mixture, and then firing and activating the workpiece in an inert gas atmosphere or steam atmosphere. This polarizable electrode is preferably bonded with a current collector using, for example, a conductive adhesive.

Preferable examples of the conducting agent to be used for a polarizable electrode include carbon black, ketjen black, acetylene black, natural graphite, artificial graphite, metal fibers, conductive titanium oxide, and ruthenium oxide. In order to achieve good conductivity (low internal resistance), the amount of the conducting agent (e.g., carbon black) used for a polarizable electrode is preferably 1 to 50% by mass in the sum of the amounts of the conducting agent and the activated carbon. If the amount of the conducting agent is too large, the capacitance of a product may be lowered.

In order to provide an electric double-layer capacitor having a large capacitance and a low internal resistance, the activated carbon used for a polarizable electrode is preferably activated carbon having an average particle size of 20 μm or smaller and a specific surface area of 1500 to 3000 $m^2/g$.

The current collector has only to be chemically and electrochemically resistant to corrosion. Preferable examples of the current collector of a polarizable electrode mainly comprising activated carbon include stainless steel, aluminum, titanium, and tantalum. Particularly preferable materials among these are stainless steel and aluminum in terms of both the characteristics and price of an electric double-layer capacitor to be obtained.

Examples of commonly known electric double-layer capacitors include wound-type electric double-layer capacitors, laminate-type electric double-layer capacitors, and coin-type electric double-layer capacitors. The electric double-layer capacitor of the present invention may be of any of these types.

For example, a wound-type electric double-layer capacitor may be produced as follows: a positive electrode and a negative electrode each having a laminate (electrode) of a current collector and an electrode layer are wound with a separator in between to form a wound element; this wound element is put into a container made of, for example, aluminum; the container is filled with an electrolyte solution; and then the container is sealed with a rubber sealing material.

The separator may be formed from any conventionally known material and may have any conventionally known structure in the present invention. Examples thereof include a polyethylene porous membrane and nonwoven fabric of polypropylene fibers, glass fibers, or cellulose fibers.

Alternatively, by a known method, an electric double-layer capacitor may be prepared in the form of a laminate-type electric double-layer capacitor comprising sheet-shaped positive and negative electrodes laminated with each other and an electrolyte solution and a separator in between, or a coin-shaped electric double-layer capacitor comprising a positive electrode and a negative electrode fixed in a coin shape using a gasket and an electrolyte solution and a separator in between.

In cases where the electrochemical device of the present invention is a device other than electric double-layer capacitors, the electrolyte solution used therein needs to be the electrolyte solution of the present invention. Still, the structure thereof is not particularly limited and a conventionally known structure may be used.

An electric double-layer capacitor comprising an electrolyte solution (A) which contains a spirobipyrrolidinium salt and a polarizable electrode (B) which contains activated carbon formed of a carbonized coconut shell is also one aspect of the invention completed by the present inventor.

Various techniques for improving the characteristics of electric double-layer capacitors have been conventionally known. The field of the art has recently desired techniques for maintaining the characteristics of electrochemical devices at high levels even under a higher voltage.

The aforementioned aspect of the invention relating to an electric double-layer capacitor is devised in consideration of the above situation, and aims to provide an electric double-layer capacitor the resistance of which is less likely to increase even after long-term use at a high voltage and which can achieve a high capacitance retention ratio.

The present inventor has found that an electric double-layer capacitor comprising an electrolyte solution which contains a spirobipyrrolidinium salt and an electrode formed from a specific activated carbon can have a high capacitance retention ratio even after long-term use at a voltage as high as 3 V or higher, and thereby completed the above aspect of the invention.

Specifically, another aspect of the invention completed by the present inventor is an electric double-layer capacitor comprising an electrolyte solution (A) which contains a spirobipyrrolidinium salt and a polarizable electrode (B) which contains activated carbon formed of a carbonized coconut shell.

The spirobipyrrolidinium salt is preferably a compound represented by the formula (1):

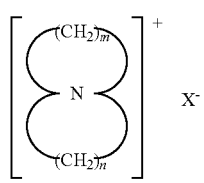

[Chem. 30]

wherein m and n individually represent an integer of 3 to 7 which may be the same as or different from each other, and X⁻ represents an anion.

The electrolyte solution preferably further contains a nitrile compound.

The activated carbon preferably has a specific surface area of 1500 to 2500 m²/g.

The activated carbon is preferably steam-activated.

The above aspect of the invention can provide an electric double-layer capacitor capable of maintaining the capacitance at high level even after long-term use at a voltage as high as 3 V or higher.

As the electric double-layer capacitor comprises an electrolyte solution (A) which contains a spirobipyrrolidinium salt and a polarizable electrode (B) which contains activated carbon obtained by carbonizing a coconut shell, it can maintain the capacitance at high level for a long time even at a high voltage.

The following will describe the electrolyte solution (A) and the polarizable electrode (B) of the electric double-layer capacitor in detail.

The electrolyte solution (A) contains a spirobipyrrolidinium salt.

The spirobipyrrolidinium salt is preferably a quaternary ammonium salt which is a compound represented by the following formula (1):

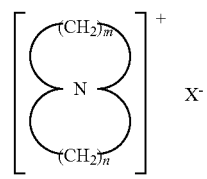

[Chem. 31]

wherein m and n individually represent an integer of 3 to 7 which may be the same as or different from each other, and X⁻ represents an anion.

In the formula (1), m and n may be the same as or different from each other and individually represent an integer of 3 to 7.

In order to achieve good solubility of the salt, m and n are each preferably an integer of 4 or 5.

X⁻ in the formula (1) is an anion. The X⁻ is preferably an anion consisting only of a non-metal element. Examples thereof include inorganic anions such as $AlCl_4^-$, $BF_4^-$, $PF_6^-$, $AsF_6^-$, $TaF_6^-$, $I^-$, and $SbF_6^-$, and organic anions such as $CF_3COO^-$, $CF_3SO_3^-$, $(CF_3SO_2)_2N^-$, and $(C_2F_5SO_2)_2N^-$.

In order to achieve good solubility of the salt, $BF_4^-$ or $PF_6^-$ is preferred.

In order to achieve good solubility of the salt, the spirobipyrrolidinium salt is specifically preferably the following:

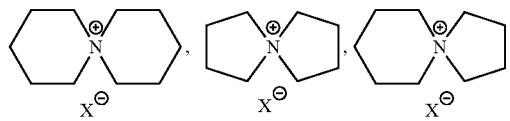

[Chem. 32]

wherein X⁻ represents $BF_4^-$ or $PF_6^-$.

The concentration of the spirobipyrrolidinium salt in the electrolyte solution is preferably 0.5 to 2.0 mol/L. If the concentration falls within the above range, an electrolyte solution which has a predetermined output can inexpensively be produced.

The concentration of the spirobipyrrolidinium salt is more preferably 0.7 mol/L or higher, still more preferably 0.8 mol/L or higher. The concentration is also more preferably 1.7 mol/L or lower, still more preferably 1.5 mol/L or lower.

The electrolyte solution preferably further contains a nitrile compound.

Examples of the nitrile compound include nitrile compounds represented by the following formula (2):

$$R^1\text{—}(CN)_n \qquad (2)$$

wherein $R^1$ represents a C1-C10 alkyl group or a C1-C10 alkylene group, and n represents an integer of 1 or 2.

If n is 1 in the formula (2), $R^1$ is a C1-C10 alkyl group. If n is 2, $R^1$ is a C1-C10 alkylene group.

Examples of the alkyl group include C1-C10 alkyl groups such as a methyl group, an ethyl group, a propyl group, an isopropyl group, a butyl group, an isobutyl group, a tert-butyl group, a pentyl group, a neopentyl group, a hexyl group, a heptyl group, an octyl group, a nonyl group, and a decyl group. Preferred are a methyl group and an ethyl group.

Examples of the alkylene group include C1-C10 alkylene groups such as a methylene group, an ethylene group, a propylene group, a butylene group, a pentylene group, a hexylene group, an octylene group, a nonylene group, and a decylene group. Preferred are a propylene group and an ethylene group.

Specific examples of the nitrile compound include acetonitrile ($CH_3$—CN), propionitrile ($CH_3$—$CH_2$—CN), and glutaronitrile (NC—$(CH_2)_3$—CN). In order to achieve a low resistance, acetonitrile and propionitrile are preferred.

The amount of the nitrile compound is preferably 50 to 100% by volume in a solvent constituting the electrolyte solution. If the amount thereof falls within the above range, the electric double-layer capacitor can have excellent withstand voltage.

The amount of the nitrile compound is more preferably 60% by volume or more, still more preferably 80% by volume or more, in a solvent constituting the electrolyte solution.

The electrolyte solution (A) of the electric double-layer capacitor may contain the respective compounds mentioned for the aforementioned electrolyte solution and electrochemical device of the present invention. The conditions mentioned as preferable are also preferably applied here.

The electric double-layer capacitor which is another aspect of the present invention completed by the present inventor comprises the aforementioned electrolyte solution (A) and a polarizable electrode (B) which comprises activated carbon formed of a carbonized coconut shell. The electric double-layer capacitor comprises the electrolyte solution, a positive electrode, and a negative electrode. At least one of the positive electrode or the negative electrode is a polarizable electrode.

The electric double-layer capacitor comprises, as an electrode, an electrode comprising activated carbon formed of a carbonized coconut shell.

The activated carbon obtained by carbonizing a coconut shell can be formed by carbonizing a coconut shell and then activating the carbonized coconut shell.

A coconut shell can be carbonized by any method, including generally known methods.

Examples of activation methods include gas activation and chemical activation.

The gas activation is a method of generating activated carbon by bringing a carbonized material into contact with steam, carbon dioxide, oxygen, or other oxidized gas at high temperature.

The chemical activation is a method of generating activated carbon by impregnating a material with an activator and heating the workpiece in an inert gas atmosphere so that activated carbon is generated due to dehydration and oxidation reactions of the activator. Examples of the activator include zinc chloride, phosphoric acid, sodium phosphate, calcium chloride, potassium sulfide, potassium hydroxide, sodium hydroxide, potassium carbonate, sodium carbonate, sodium sulfate, potassium sulfate, and calcium carbonate.

In order to provide activated carbon with excellent durability, the activation method is preferably steam activation.

Specific examples of methods of preparing activated carbon by carbonizing a coconut shell include a method in which a coconut shell is pulverized and the sizes of the pulverized pieces are adjusted, the pulverized coconut shell is carbonized in an inert gas atmosphere to provide a coconut shell char, and then the resulting coconut shell char is heated at 800° C. to 1300° C. in an inert gas such as nitrogen or argon containing 30% by volume or higher but 100% by volume or lower of a steam atmosphere.

The coconut shell before activation, coconut shell char, and activated carbon obtained by activation may be washed in an acid aqueous solution such as hydrochloric acid, nitric acid, or sulfuric acid so that the metal impurities and ashes contained in the carbon are removed.

The activated carbon obtained by carbonizing a coconut shell may have any shape such as a pulverized form, particles, granules, fibers, felt, a textile, or a sheet.

In the cases of activated carbon particles, the average particle size thereof is preferably 30 μm or smaller, more preferably 7 to 20 μm, in order to improve the electrode bulk density and to reduce the internal resistance.

The activated carbon obtained by carbonizing a coconut shell preferably has a specific surface area of 1500 to 2500 $m^2/g$. If the specific surface area falls within the above range, a sufficient capacitance can be achieved and activated carbon can inexpensively be produced.

The specific surface area is more preferably 1600 $m^2/g$ or larger and 2100 $m^2/g$ or smaller.

The specific surface area is a value determined by the BET method.

The activated carbon obtained by carbonizing a coconut shell preferably has an oxygen concentration of 100 mg or lower per gram of the activated carbon. The oxygen concentration within the above range can suppress generation of gas inside the resulting cell.

An electrode mainly comprising the activated carbon can be formed by any method, including known methods. For example, a polarizable electrode comprising the activated carbon and carbon black can be produced by mixing powder of the activated carbon, carbon black, and phenolic resin, press-molding the mixture, and then firing and activating the workpiece in an inert gas atmosphere or steam atmosphere. This polarizable electrode is preferably bonded with a current collector using, for example, a conductive adhesive.

Alternatively, a polarizable electrode may be formed by kneading the activated carbon powder, carbon black, and a binder in the presence of an alcohol to form a sheet-shaped mixture, and then drying the sheet-shaped mixture. This binder may be polytetrafluoroethylene, for example. Alternatively, a polarizable electrode integrated with a current collector may be formed by mixing the activated carbon powder, conductive agent (e.g., carbon black), a binder, and a solvent to form slurry, applying this slurry to a metal foil of a current collector, and drying the applied slurry.

Both electrodes of the electric double-layer capacitor may be a polarizable electrode mainly comprising the activated carbon. Further, the electric double-layer capacitor may have a structure in which one electrode thereof is a non-polarizable electrode. Examples of such a structure include a structure in which a positive electrode mainly comprises a cell active material such as a metal oxide and a negative electrode is a polarizable electrode mainly comprising the activated carbon; and a structure in which a negative electrode comprises metallic lithium or a lithium alloy and a polarizable electrode mainly comprises the activated carbon.

In combination with the activated carbon, a carbonaceous material may be used such as carbon black, graphite, expanded graphite, porous carbon, carbon nanotube, carbon nanohorn, and ketjen black.

The solvent to be used for preparation of slurry in the production of an electrode is preferably one that dissolves a binder. The solvent is appropriately selected from N-methylpyrrolidone, dimethylformamide, toluene, xylene, isophorone, methyl ethyl ketone, ethyl acetate, methyl acetate, dimethyl phthalate, ethanol, methanol, butanol, and water in accordance with the type of the binder.

Preferable examples of the conducting agent to be used for a polarizable electrode include carbon black, ketjen black, acetylene black, natural graphite, artificial graphite, metal fibers, conductive titanium oxide, and ruthenium oxide. In order to achieve good conductivity (low internal resistance), the amount of the conducting agent (e.g., carbon black) used for a polarizable electrode is preferably 1 to 50% by mass in the sum of the amounts of the conducting agent and the activated carbon. If the amount of the conducting agent is too large, the capacitance of a product may be lowered.

The current collector has only to be chemically and electrochemically resistant to corrosion. Preferable examples of the current collector of a polarizable electrode mainly comprising activated carbon include stainless steel, aluminum, titanium, and tantalum. Particularly preferable materials among these are stainless steel and aluminum in terms of both the characteristics and price of an electric double-layer capacitor to be obtained.

Examples of commonly known electric double-layer capacitors include wound-type electric double-layer capacitors, laminate-type electric double-layer capacitors, and coin-type electric double-layer capacitors. The electric double-layer capacitor of the present invention may be of any of these types.

For example, a wound-type electric double-layer capacitor may be produced as follows: a positive electrode and a negative electrode each having a laminate (electrode) of a current collector and an electrode layer are wound with a separator in between to form a wound element; this wound element is put into a container made of, for example, aluminum; the container is filled with an electrolyte solution; and then the container is sealed with a rubber sealing material.

The separator may be formed from any conventionally known material and may have any conventionally known structure in the present invention. Examples thereof include a polyethylene porous membrane and nonwoven fabric of polypropylene fibers, glass fibers, or cellulose fibers.

Alternatively, by a known method, an electric double-layer capacitor may be prepared in the form of a laminate-type electric double-layer capacitor comprising sheet-shaped positive and negative electrodes laminated with each other and an electrolyte solution and a separator in between, or a coin-shaped electric double-layer capacitor comprising a positive electrode and a negative electrode fixed in a coin shape using a gasket and an electrolyte solution and a separator in between.

As mentioned above, the electric double-layer capacitor comprises a specific electrolyte solution (A) and a specific polarizable electrode (B) which comprises activated carbon. Thus, it can maintain a high capacitance even after a high voltage is applied thereto for a long time.

Other aspects of the present invention completed by the present inventor are listed below.

(Addition 1)

An electric double-layer capacitor comprising an electrolyte solution (A) which contains a spirobipyrrolidinium salt and a polarizable electrode (B) which comprises activated carbon formed of a carbonized coconut shell.

(Addition 2)

The electric double-layer capacitor according to Addition 1, wherein the spirobipyrrolidinium salt is a compound represented by the formula (1):

[Chem. 33]

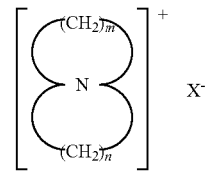

wherein m and n individually represent an integer of 3 to 7 which may be the same as or different from each other, and $X^-$ represents an anion.

(Addition 3)

The electric double-layer capacitor according to Addition 1 or 2, wherein the electrolyte solution further contains a nitrile compound.

(Addition 4)

The electric double-layer capacitor according to Addition 1, 2, or 3, wherein the activated carbon has a specific surface area of 1500 to 2500 $m^2/g$.

(Addition 5)

The electric double-layer capacitor according to Addition 1, 2, 3, or 4, wherein the activated carbon is steam activated.

EXAMPLES

The following will describe the present invention referring to, but not limited to, examples and comparative examples.

Example 1

An electrolyte solution was prepared as follows. Piperidine spiropyrrolidinium tetrafluoroborate was added to acetonitrile so as to be a concentration in the electrolyte solution of 1.0 mol/L, and adiponitrile was added thereto so as to be a concentration in the electrolyte solution of 0.05% by mass.

Using the resulting electrolyte solution, an electric double-layer capacitor was produced by the following method. The resulting electric double-layer capacitor was evaluated for withstand voltage (long-term reliability at 3 V). The results are shown in Table 1.

(Production of Electrode)
(Preparation of Slurry for Electrodes)

First, 100 parts by weight of steam-activated carbon formed from coconut shell (YP50F, Kuraray Chemical Co., Ltd., specific surface area: 1600 m$^2$/g), 3 parts by weight of acetylene black (DENKA BLACK, Denki Kagaku Kogyo K. K.) as a conductive agent, 2 parts by weight of ketjen black (carbon ECP600JD, Lion Corp.), 4 parts by weight of elastomer binder, 2 parts by weight of PTFE (POLYFLON PTFE D-210C, Daikin Industries, Ltd.), and a surfactant (trade name: DN-800H, Daicel Corp.) were mixed to provide slurry for electrodes.

Edged aluminum (20CB, Japan Capacitor Industrial Co., Ltd., thickness: about 20 μm) was prepared as a current collector. To one face of this current collector was applied the slurry for electrodes using a coating device and thus an electrode layer (thickness: 100 μm) was formed. Thereby, an electrode was produced.

(Production of Laminate Cell Electric Double-Layer Capacitor)

The electrode was cut into a predetermined size (20×72 mm). An electrode lead was welded to the aluminum surface of the current collector, and a separator (TF45-30, Nippon Kodoshi Corp.) was inserted between electrodes. The workpiece was put into a laminate case (product No. D-EL40H, Dai Nippon Printing Co., Ltd.). An electrolyte solution was filled into the case and the workpiece was impregnated therewith in a dry chamber. Then, the case was sealed, and thereby a laminate cell electric double-layer capacitor was produced.

(1) Withstand Voltage (Long-Term Reliability)

The laminate cell electric double-layer capacitor was put into a thermostat chamber at a temperature of 65° C., and the capacitance was measured by applying a voltage of 3.0 V for 500 hours. The measurement timings were initial (0 hours), 250 hours, and 500 hours after the start of the measurement. Based on the measured values, the capacitance retention ratio (%) was calculated by the following formula.

Capacitance retention ratio (%)=(capacitance at each timing/capacitance before evaluation (initial capacitance))×100

Those having a capacitance retention ratio of 80% or higher after 500 hours were evaluated as excellent in durability.

Example 2

An electrolyte solution was prepared as follows: Piperidine spiropyrrolidinium tetrafluoroborate was added to acetonitrile so as to be a concentration in the electrolyte solution of 1.0 mol/L, and adiponitrile was added thereto so as to be a concentration in the electrolyte solution of 0.5% by mass. Using the resulting electrolyte solution, a laminate cell electric double-layer capacitor was produced and the withstand voltage thereof was evaluated in the same manner as in Example 1. The results are shown in Table 1.

Example 3

An electrolyte solution was prepared as follows: Piperidine spiropyrrolidinium tetrafluoroborate was added to acetonitrile so as to be a concentration in the electrolyte solution of 1.0 mol/L, and adiponitrile was added thereto so as to be a concentration in the electrolyte solution of 1.0% by mass. Using the resulting electrolyte solution, a laminate cell electric double-layer capacitor was produced and the withstand voltage thereof was evaluated in the same manner as in Example 1. The results are shown in Table 1.

Example 4

An electrolyte solution was prepared as follows: Piperidine spiropyrrolidinium tetrafluoroborate was added to acetonitrile so as to be a concentration in the electrolyte solution of 1.0 mol/L, and adiponitrile was added thereto so as to be a concentration in the electrolyte solution of 5.0% by mass. Using the resulting electrolyte solution, a laminate cell electric double-layer capacitor was produced and the withstand voltage thereof was evaluated in the same manner as in Example 1. The results are shown in Table 1.

Reference Example 1

An electrolyte solution was prepared as follows: Piperidine spiropyrrolidinium tetrafluoroborate was added to acetonitrile so as to be uniform at a concentration in the electrolyte solution of 1.0 mol/L. Using the resulting electrolyte solution, a laminate cell electric double-layer capacitor was produced and the withstand voltage thereof was evaluated in the same manner as in Example 1. The results are shown in Table 1.

Comparative Example 2

An electrolyte solution was prepared as follows: Piperidine spiropyrrolidinium tetrafluoroborate was added to acetonitrile so as to be a concentration in the electrolyte solution of 1.0 mol/L, and adiponitrile was added thereto so as to be a concentration in the electrolyte solution of 7.5% by mass. Using the resulting electrolyte solution, a laminate cell electric double-layer capacitor was produced and the withstand voltage thereof was evaluated in the same manner as in Example 1. The results are shown in Table 1.

Example 5

An electrolyte solution was prepared as follows: Piperidine spiropyrrolidinium tetrafluoroborate was added to acetonitrile so as to be a concentration in the electrolyte solution of 1.0 mol/L, and succinonitrile was added thereto so as to be a concentration in the electrolyte solution of 0.05% by mass. Using the resulting electrolyte solution, a laminate cell electric double-layer capacitor was produced and the withstand voltage thereof was evaluated in the same manner as in Example 1. The results are shown in Table 2.

Example 6

An electrolyte solution was prepared as follows: Piperidine spiropyrrolidinium tetrafluoroborate was added to acetonitrile so as to be a concentration in the electrolyte solution of 1.0 mol/L, and succinonitrile was added thereto so as to be a concentration in the electrolyte solution of 0.5% by mass. Using the resulting electrolyte solution, a laminate cell electric double-layer capacitor was produced and the withstand voltage thereof was evaluated in the same manner as in Example 1. The results are shown in Table 2.

Example 7

An electrolyte solution was prepared as follows: Piperidine spiropyrrolidinium tetrafluoroborate was added to acetonitrile so as to be a concentration in the electrolyte solution of 1.0 mol/L, and succinonitrile was added thereto so as to be a concentration in the electrolyte solution of 1.0% by mass. Using the resulting electrolyte solution, a laminate cell electric double-layer capacitor was produced and the withstand voltage thereof was evaluated in the same manner as in Example 1. The results are shown in Table 2.

Example 8

An electrolyte solution was prepared as follows: Piperidine spiropyrrolidinium tetrafluoroborate was added to acetonitrile so as to be a concentration in the electrolyte solution of 1.0 mol/L, and succinonitrile was added thereto so as to be a concentration in the electrolyte solution of 5.0% by mass. Using the resulting electrolyte solution, a laminate cell electric double-layer capacitor was produced and the withstand voltage thereof was evaluated in the same manner as in Example 1. The results are shown in Table 2.

Comparative Example 3

An electrolyte solution was prepared as follows: Piperidine spiropyrrolidinium tetrafluoroborate was added to acetonitrile so as to be a concentration in the electrolyte solution of 1.0 mol/L, and succinonitrile was added thereto so as to be a concentration in the electrolyte solution of 7.5% by mass. Using the resulting electrolyte solution, a laminate cell electric double-layer capacitor was produced and the withstand voltage thereof was evaluated in the same manner as in Example 1. The results are shown in Table 2.

Example 9

An electrolyte solution was prepared as follows: Piperidine spiropyrrolidinium tetrafluoroborate was added to acetonitrile so as to be a concentration in the electrolyte solution of 1.0 mol/L, and glutaronitrile was added thereto so as to be a concentration in the electrolyte solution of 0.05% by mass. Using the resulting electrolyte solution, a laminate cell electric double-layer capacitor was produced and the withstand voltage thereof was evaluated in the same manner as in Example 1. The results are shown in Table 3.

Example 10

An electrolyte solution was prepared as follows: Piperidine spiropyrrolidinium tetrafluoroborate was added to acetonitrile so as to be a concentration in the electrolyte solution of 1.0 mol/L, and glutaronitrile was added thereto so as to be a concentration in the electrolyte solution of 0.5% by mass. Using the resulting electrolyte solution, a laminate cell electric double-layer capacitor was produced and the withstand voltage thereof was evaluated in the same manner as in Example 1. The results are shown in Table 3.

Example 11

An electrolyte solution was prepared as follows: Piperidine spiropyrrolidinium tetrafluoroborate was added to acetonitrile so as to be a concentration in the electrolyte solution of 1.0 mol/L, and glutaronitrile was added thereto so as to be a concentration in the electrolyte solution of 1.0% by mass. Using the resulting electrolyte solution, a laminate cell electric double-layer capacitor was produced and the withstand voltage thereof was evaluated in the same manner as in Example 1. The results are shown in Table 3.

Example 12

An electrolyte solution was prepared as follows: Piperidine spiropyrrolidinium tetrafluoroborate was added to acetonitrile so as to be a concentration in the electrolyte solution of 1.0 mol/L, and glutaronitrile was added thereto so as to be a concentration in the electrolyte solution of 5.0% by mass. Using the resulting electrolyte solution, a laminate cell electric double-layer capacitor was produced and the withstand voltage thereof was evaluated in the same manner as in Example 1. The results are shown in Table 3.

Comparative Example 4

An electrolyte solution was prepared as follows: Piperidine spiropyrrolidinium tetrafluoroborate was added to acetonitrile so as to be a concentration in the electrolyte solution of 1.0 mol/L, and glutaronitrile was added thereto so as to be a concentration in the electrolyte solution of 7.5% by mass. Using the resulting electrolyte solution, a laminate cell electric double-layer capacitor was produced and the withstand voltage thereof was evaluated in the same manner as in Example 1. The results are shown in Table 3.

Example 13

An electrolyte solution was prepared as follows: Piperidine spiropyrrolidinium tetrafluoroborate was added to acetonitrile so as to be a concentration in the electrolyte solution of 1.0 mol/L, and 4-cyanopentanedinitrile was added thereto so as to be a concentration in the electrolyte solution of 0.05% by mass. Using the resulting electrolyte solution, a laminate cell electric double-layer capacitor was produced and the withstand voltage thereof was evaluated in the same manner as in Example 1. The results are shown in Table 4.

Example 14

An electrolyte solution was prepared as follows: Piperidine spiropyrrolidinium tetrafluoroborate was added to acetonitrile so as to be a concentration in the electrolyte solution of 1.0 mol/L, and 4-cyanopentanedinitrile was added thereto so as to be a concentration in the electrolyte solution of 0.5% by mass. Using the resulting electrolyte solution, a laminate cell electric double-layer capacitor was produced and the withstand voltage thereof was evaluated in the same manner as in Example 1. The results are shown in Table 4.

Example 15

An electrolyte solution was prepared as follows: Piperidine spiropyrrolidinium tetrafluoroborate was added to acetonitrile so as to be a concentration in the electrolyte solution of 1.0 mol/L, and 4-cyanopentanedinitrile was added thereto so as to be a concentration in the electrolyte solution of 1.0% by mass. Using the resulting electrolyte solution, a laminate cell electric double-layer capacitor was produced and the withstand voltage thereof was evaluated in the same manner as in Example 1. The results are shown in Table 4.

Example 16

An electrolyte solution was prepared as follows: Piperidine spiropyrrolidinium tetrafluoroborate was added to acetonitrile so as to be a concentration in the electrolyte solution of 1.0 mol/L, and 4-cyanopentanedinitrile was added thereto so as to be a concentration in the electrolyte solution of 5.0% by mass. Using the resulting electrolyte solution, a laminate cell electric double-layer capacitor was produced and the withstand voltage thereof was evaluated in the same manner as in Example 1. The results are shown in Table 4.

Comparative Example 5

An electrolyte solution was prepared as follows: Piperidine spiropyrrolidinium tetrafluoroborate was added to acetonitrile so as to be a concentration in the electrolyte solution of 1.0 mol/L, and 4-cyanopentanedinitrile was added thereto so as to be a concentration in the electrolyte solution of 7.5% by mass. Using the resulting electrolyte solution, a laminate cell electric double-layer capacitor was produced and the withstand voltage thereof was evaluated in the same manner as in Example 1. The results are shown in Table 4.

Comparative Example 6

An electrolyte solution was prepared as follows: Tetraethyl ammonium tetrafluoroborate was added to acetonitrile so as to be a concentration in the electrolyte solution of 1.0 mol/L. Using the resulting electrolyte solution, a laminate cell electric double-layer capacitor was produced in the same manner as in Example 1, and the withstand voltage thereof was evaluated by the following method.
(2) Withstand Voltage (Long-Term Reliability)

The laminate cell electric double-layer capacitor was put into a thermostat chamber at a temperature of 60° C., and the capacitance was measured by applying a voltage of 2.7 V for 500 hours. The measurement timings were initial (0 hours), 250 hours, and 500 hours after the start of the measurement. Based on the measured values, the capacitance retention ratio (%) was calculated by the following formula.

Capacitance retention ratio (%)=(capacitance at each timing/capacitance before evaluation (initial capacitance))×100

The results are shown in Table 5.

Example 17

An electrolyte solution was prepared as follows: Tetraethyl ammonium tetrafluoroborate was added to acetonitrile so as to be a concentration in the electrolyte solution of 1.0 mol/L, and adiponitrile was added thereto so as to be a concentration in the electrolyte solution of 0.05% by mass. Using the resulting electrolyte solution, a laminate cell electric double-layer capacitor was produced and the withstand voltage thereof was evaluated in the same manner as in Comparative Example 6. The results are shown in Table 5.

Example 18

An electrolyte solution was prepared as follows: Tetraethyl ammonium tetrafluoroborate was added to acetonitrile so as to be a concentration in the electrolyte solution of 1.0 mol/L, and adiponitrile was added thereto so as to be a concentration in the electrolyte solution of 0.5% by mass. Using the resulting electrolyte solution, a laminate cell electric double-layer capacitor was produced and the withstand voltage thereof was evaluated in the same manner as in Comparative Example 6. The results are shown in Table 5.

Example 19

An electrolyte solution was prepared as follows: Tetraethyl ammonium tetrafluoroborate was added to acetonitrile so as to be a concentration in the electrolyte solution of 1.0 mol/L, and adiponitrile was added thereto so as to be a concentration in the electrolyte solution of 1.0% by mass. Using the resulting electrolyte solution, a laminate cell electric double-layer capacitor was produced and the withstand voltage thereof was evaluated in the same manner as in Comparative Example 6. The results are shown in Table 5.

Example 20

An electrolyte solution was prepared as follows: Tetraethyl ammonium tetrafluoroborate was added to acetonitrile so as to be a concentration in the electrolyte solution of 1.0 mol/L, and adiponitrile was added thereto so as to be a concentration in the electrolyte solution of 5.0% by mass. Using the resulting electrolyte solution, a laminate cell electric double-layer capacitor was produced and the withstand voltage thereof was evaluated in the same manner as in Comparative Example 6. The results are shown in Table 5.

Comparative Example 7

An electrolyte solution was prepared as follows: Tetraethyl ammonium tetrafluoroborate was added to acetonitrile so as to be a concentration in the electrolyte solution of 1.0 mol/L, and adiponitrile was added thereto so as to be a concentration in the electrolyte solution of 7.5% by mass. Using the resulting electrolyte solution, a laminate cell electric double-layer capacitor was produced and the withstand voltage thereof was evaluated in the same manner as in Comparative Example 6. The results are shown in Table 5.

Example 21

An electrolyte solution was prepared as follows: Tetraethyl ammonium tetrafluoroborate was added to acetonitrile so as to be a concentration in the electrolyte solution of 1.0 mol/L, and succinonitrile was added thereto so as to be a concentration in the electrolyte solution of 0.05% by mass. Using the resulting electrolyte solution, a laminate cell electric double-layer capacitor was produced and the withstand voltage thereof was evaluated in the same manner as in Comparative Example 6. The results are shown in Table 6.

Example 22

An electrolyte solution was prepared as follows: Tetraethyl ammonium tetrafluoroborate was added to acetonitrile so as to be a concentration in the electrolyte solution of 1.0 mol/L, and succinonitrile was added thereto so as to be a concentration in the electrolyte solution of 0.5% by mass. Using the resulting electrolyte solution, a laminate cell electric double-layer capacitor was produced and the withstand voltage thereof was evaluated in the same manner as in Comparative Example 6. The results are shown in Table 6.

Example 23

An electrolyte solution was prepared as follows: Tetraethyl ammonium tetrafluoroborate was added to acetonitrile so as to be a concentration in the electrolyte solution of 1.0 mol/L, and succinonitrile was added thereto so as to be a concentration in the electrolyte solution of 1.0% by mass. Using the resulting electrolyte solution, a laminate cell electric double-layer capacitor was produced and the withstand voltage thereof was evaluated in the same manner as in Comparative Example 6. The results are shown in Table 6.

Example 24

An electrolyte solution was prepared as follows: Tetraethyl ammonium tetrafluoroborate was added to acetonitrile so as to be a concentration in the electrolyte solution of 1.0 mol/L, and succinonitrile was added thereto so as to be a concentration in the electrolyte solution of 5.0% by mass. Using the resulting electrolyte solution, a laminate cell electric double-layer capacitor was produced and the withstand voltage thereof was evaluated in the same manner as in Comparative Example 6. The results are shown in Table 6.

Comparative Example 8

An electrolyte solution was prepared as follows: Tetraethyl ammonium tetrafluoroborate was added to acetonitrile so as to be a concentration in the electrolyte solution of 1.0 mol/L, and succinonitrile was added thereto so as to be a concentration in the electrolyte solution of 7.5% by mass. Using the resulting electrolyte solution, a laminate cell electric double-layer capacitor was produced and the withstand voltage thereof was evaluated in the same manner as in Comparative Example 6. The results are shown in Table 6.

Example 25

An electrolyte solution was prepared as follows: Tetraethyl ammonium tetrafluoroborate was added to acetonitrile so as to be a concentration in the electrolyte solution of 1.0 mol/L, and glutaronitrile was added thereto so as to be a concentration in the electrolyte solution of 0.05% by mass. Using the resulting electrolyte solution, a laminate cell electric double-layer capacitor was produced and the withstand voltage thereof was evaluated in the same manner as in Comparative Example 6. The results are shown in Table 7.

Example 26

An electrolyte solution was prepared as follows: Tetraethyl ammonium tetrafluoroborate was added to acetonitrile so as to be a concentration in the electrolyte solution of 1.0 mol/L, and glutaronitrile was added thereto so as to be a concentration in the electrolyte solution of 0.5% by mass. Using the resulting electrolyte solution, a laminate cell electric double-layer capacitor was produced and the withstand voltage thereof was evaluated in the same manner as in Comparative Example 6. The results are shown in Table 7.

Example 27

An electrolyte solution was prepared as follows: Tetraethyl ammonium tetrafluoroborate was added to acetonitrile so as to be a concentration in the electrolyte solution of 1.0 mol/L, and glutaronitrile was added thereto so as to be a concentration in the electrolyte solution of 1.0% by mass. Using the resulting electrolyte solution, a laminate cell electric double-layer capacitor was produced and the withstand voltage thereof was evaluated in the same manner as in Comparative Example 6. The results are shown in Table 7.

Example 28

An electrolyte solution was prepared as follows: Tetraethyl ammonium tetrafluoroborate was added to acetonitrile so as to be a concentration in the electrolyte solution of 1.0 mol/L, and glutaronitrile was added thereto so as to be a concentration in the electrolyte solution of 5.0% by mass. Using the resulting electrolyte solution, a laminate cell electric double-layer capacitor was produced and the withstand voltage thereof was evaluated in the same manner as in Comparative Example 6. The results are shown in Table 7.

Comparative Example 9

An electrolyte solution was prepared as follows: Tetraethyl ammonium tetrafluoroborate was added to acetonitrile so as to be a concentration in the electrolyte solution of 1.0 mol/L, and glutaronitrile was added thereto so as to be a concentration in the electrolyte solution of 7.5% by mass. Using the resulting electrolyte solution, a laminate cell electric double-layer capacitor was produced and the withstand voltage thereof was evaluated in the same manner as in Comparative Example 6. The results are shown in Table 7.

TABLE 1

| Capacitance retention rate (%) | Example 1 | Example 2 | Example 3 | Example 4 | Reference Example 1 | Comparative Example 2 |
|---|---|---|---|---|---|---|
| 0 h | 100 | 100 | 100 | 100 | 100 | 100 |
| 250 h | 94 | 95 | 95 | 94 | 93 | 74 |
| 500 h | 89 | 94 | 94 | 69 | 87 | 62 |

TABLE 2

| Capacitance retention rate (%) | Example 5 | Example 6 | Example 7 | Example 8 | Comparative Example 3 |
|---|---|---|---|---|---|
| 0 h | 100 | 100 | 100 | 100 | 100 |
| 250 h | 93 | 94 | 94 | 93 | 70 |
| 500 h | 88 | 93 | 92 | 87 | 58 |

TABLE 3

| Capacitance retention rate (%) | Example 9 | Example 10 | Example 11 | Example 12 | Comparative Example 4 |
|---|---|---|---|---|---|
| 0 h | 100 | 100 | 100 | 100 | 100 |
| 250 h | 93 | 93 | 93 | 92 | 67 |
| 500 h | 87 | 92 | 91 | 87 | 56 |

TABLE 4

| Capacitance retention rate (%) | Example 13 | Example 14 | Example 15 | Example 16 | Comparative Example 5 |
|---|---|---|---|---|---|
| 0 h | 100 | 100 | 100 | 100 | 100 |
| 250 h | 94 | 95 | 94 | 92 | 71 |
| 500 h | 89 | 94 | 93 | 89 | 60 |

TABLE 5

| Capacitance retention rate (%) | Example 17 | Example 18 | Example 19 | Example 20 | Comparative Example 6 | Comparative Example 7 |
|---|---|---|---|---|---|---|
| 0 h | 100 | 100 | 100 | 100 | 100 | 100 |
| 250 h | 95 | 96 | 96 | 95 | 90 | 71 |
| 500 h | 90 | 93 | 93 | 93 | 85 | 63 |

TABLE 6

| Capacitance retention rate (%) | Example 21 | Example 22 | Example 23 | Example 24 | Comparative Example 8 |
|---|---|---|---|---|---|
| 0 h | 100 | 100 | 100 | 100 | 100 |
| 250 h | 92 | 92 | 92 | 91 | 70 |
| 500 h | 89 | 91 | 90 | 88 | 56 |

TABLE 7

| Capacitance retention rate (%) | Example 25 | Example 26 | Example 27 | Example 28 | Comparative Example 9 |
|---|---|---|---|---|---|
| 0 h | 100 | 100 | 100 | 100 | 100 |
| 250 h | 90 | 91 | 91 | 91 | 68 |
| 500 h | 87 | 89 | 90 | 87 | 53 |

The following will describe the experimental examples of the electric double-layer capacitor.

Experimental Example 1

(Production of Electrode)
(Preparation of Slurry for Electrode)

First, 100 parts by weight of steam-activated carbon formed from coconut shell (YP50F, Kuraray Chemical Co., Ltd., specific surface area: 1600 m²/g), 3 parts by weight of acetylene black (DENKA BLACK, Denki Kagaku Kogyo K.K.) as a conductive agent, 2 parts by weight of ketjen black (carbon ECP600JD, Lion Corp.), 4 parts by weight of elastomer binder, 2 parts by weight of PTFE (POLYFLON PTFE D-210C, Daikin Industries, Ltd.), and a surfactant (trade name: DN-800H, Daicel Corp.) were mixed to provide slurry for electrodes.

Edged aluminum (20CB, Japan Capacitor Industrial Co., Ltd., thickness: about 20 μm) was prepared as a current collector. To one face of this current collector was applied the slurry for electrodes using a coating device and thus an electrode layer (thickness: 100 μm) was formed. Thereby, an electrode was produced.

(Production of Laminate Cell Electric Double-Layer Capacitor)

The electrode was cut into a predetermined size (20×72 mm). An electrode lead was welded to the aluminum surface of the current collector, and a separator (TF45-30, Nippon Kodoshi CORP.) was inserted between electrodes. The workpiece was put into a laminate case (product No.: D-EL40H, Dai Nippon Printing Co., Ltd.). An electrolyte solution was filled into the case and the workpiece was impregnated therewith in a dry chamber. Then, the case was sealed, and thereby a laminate cell electric double-layer capacitor was produced.

(Preparation of Electrolyte Solution)

Spiro-bipyrrolidinium tetrafluoroborate was added to acetonitrile so as to be a concentration of 1.2 mol/L. The product was a uniform solution, and this solution was used as an electrolyte solution.

The electric double-layer capacitor produced was evaluated for initial characteristics (capacitance (F) and internal resistance (mΩ)), and withstand voltage (long-term reliability at 3 V) by the following methods. The results are shown in Table 8.

(1) Initial Characteristics

An electronic power source was connected to the laminate cell electric double-layer capacitor. Then, constant-current charging was performed on a wound cell at a constant current and the charging voltage was increased up to a prescribed voltage. As the charging voltage reached the prescribed voltage, the voltage was kept constant for 10 minutes. Then, as an operator confirmed that the charging current sufficiently decreased and was in the saturated state, constant-current discharging was started and the cell voltage was measured at every 0.1 seconds. The capacitance (F) and the internal resistance (mΩ) of the capacitor were measured in conformity with the measurement method of RC2377, Japan Electronics and Information Technology Industries Association (JEITA).

(Measurement Conditions of RC2377, JEITA)
Power supply voltage: 3.0 V
Discharging current: 40 mA (2) Withstand Voltage (Long-Term Reliability)

The laminate cell electric double-layer capacitor was put into a thermostat chamber at a temperature of 65° C. The capacitance and the internal resistance were measured by applying a voltage of 3.0 V for 500 hours. The measurement timings were initial (0 hours) and 500 hours after the start of the measurement. Based on the measured values, the capacitance retention ratio (%) and the internal resistance increasing rate were calculated by the following formula.

Capacitance retention ratio (%)=(capacitance at each timing/capacitance before evaluation (initial capacitance))×100

Internal resistance increasing rate=(internal resistance at each timing/internal resistance before evaluation (initial internal resistance))

Those having a capacitance retention ratio of 80% or higher and an internal resistance increasing rate of twice or less after 500 hours were evaluated as excellent in durability.

Experimental Example 2

First, 100 parts by weight of steam-activated carbon formed from coconut shell (YP80F, Kuraray Chemical Co., Ltd., specific surface area: 2100 $m^2/g$), 3 parts by weight of acetylene black (DENKA BLACK, Denki Kagaku Kogyo K. K.) as a conductive agent, 2 parts by weight of ketjen black (carbon ECP600JD, Lion Corp.), 4 parts by weight of elastomer binder, 2 parts by weight of PTFE (POLYFLON PTFE D-210C, Daikin Industries, Ltd.), and a surfactant (trade name: DN-800H, Daicel Corp.) were mixed to provide slurry for electrodes. A laminate cell electric double-layer capacitor was produced and the initial characteristics and the withstand voltage were determined in the same manner as in Experimental Example 1 except for using the resulting slurry for electrodes. The results are shown in Table 8.

Experimental Example 3

First, 100 parts by weight of steam-activated carbon formed from phenolic resin (specific surface area: 1800 $m^2/g$), 3 parts by weight of acetylene black (DENKA BLACK, Denki Kagaku Kogyo K. K.) as a conductive agent, 2 parts by weight of ketjen black (carbon ECP600JD, Lion Corp.), 4 parts by weight of elastomer binder, 2 parts by weight of PTFE (POLYFLON PTFE D-210C, Daikin Industries, Ltd.), and a surfactant (trade name: DN-800H, Daicel Corp.) were mixed to provide slurry for electrodes. A laminate cell electric double-layer capacitor was produced and the initial characteristics and the withstand voltage were determined in the same manner as in Experimental Example 1 except for using the resulting slurry for electrodes. The results are shown in Table 8.

Experimental Example 4

First, 100 parts by weight of alkali-activated carbon formed from petroleum coke (specific surface area: 2100 $m^2/g$), 3 parts by weight of acetylene black (DENKA BLACK, Denki Kagaku Kogyo K. K.) as a conductive agent, 2 parts by weight of ketjen black (carbon ECP600JD, Lion Corp.), 4 parts by weight of elastomer binder, 2 parts by weight of PTFE (POLYFLON PTFE D-210C, Daikin Industries, Ltd.), and a surfactant (trade name: DN-800H, Daicel Corp.) were mixed to provide slurry for electrodes. A laminate cell electric double-layer capacitor was produced and the initial characteristics and the withstand voltage were determined in the same manner as in Experimental Example 1 except for using the resulting slurry for electrodes. The results are shown in Table 8.

Experimental Example 5

A laminate cell electric double-layer capacitor was produced and the initial characteristics and the withstand voltage were determined in the same manner as in Experimental Example 1 except for using an electrolyte solution prepared by dissolving piperidine spiropyrrolidinium tetrafluoroborate in acetonitrile so as to be a concentration of 1.2 mol/L. The experimental results are shown in Table 9.

Experimental Example 6

First, 100 parts by weight of steam-activated carbon formed from coconut shell (YP80F, Kuraray Chemical Co., Ltd., specific surface area: 2100 $m^2/g$), 3 parts by weight of acetylene black (DENKA BLACK, Denki Kagaku Kogyo K. K.) as a conductive agent, 2 parts by weight of ketjen black (carbon ECP600JD, Lion Corp.), 4 parts by weight of elastomer binder, 2 parts by weight of PTFE (POLYFLON PTFE D-210C, Daikin Industries, Ltd.), and a surfactant (trade name: DN-800H, Daicel Corp.) were mixed to provide slurry for electrodes. A laminate cell electric double-layer capacitor was produced and the initial characteristics and the withstand voltage were determined in the same manner as in Experimental Example 1 except for using the resulting slurry for electrodes and the same electrolyte solution as in Experimental Example 5. The results are shown in Table 9.

Experimental Example 7

First, 100 parts by weight of steam-activated carbon formed from phenolic resin (specific surface area: 1800 $m^2/g$), 3 parts by weight of acetylene black (DENKA BLACK, Denki Kagaku Kogyo K. K.) as a conductive agent, 2 parts by weight of ketjen black (carbon ECP600JD, Lion Corp.), 4 parts by weight of elastomer binder, 2 parts by weight of PTFE (POLYFLON PTFE D-210C, Daikin Industries, Ltd.), and a surfactant (trade name: DN-800H, Daicel Corp.) were mixed to provide slurry for electrodes. A laminate cell electric double-layer capacitor was produced and the initial characteristics and the withstand voltage were determined in the same manner as in Experimental Example 1 except for using the resulting slurry for electrodes and the same electrolyte solution as in Experimental Example 5. The results are shown in Table 9.

Experimental Example 8

First, 100 parts by weight of alkali-activated carbon formed from petroleum coke (specific surface area: 2100 $m^2/g$), 3 parts by weight of acetylene black (DENKA BLACK, Denki Kagaku Kogyo K. K.) as a conductive agent, 2 parts by weight of ketjen black (carbon ECP600JD, Lion Corp.), 4 parts by weight of elastomer binder, 2 parts by weight of PTFE (POLYFLON PTFE D-210C, Daikin Industries, Ltd.), and a surfactant (trade name: DN-800H, Daicel Corp.) were mixed to provide slurry for electrodes. A laminate cell electric double-layer capacitor was produced and the initial characteristics and the withstand voltage were determined in the same manner as in Experimental Example 1 except for using the resulting slurry for electrodes and the same electrolyte solution as in Experimental Example 5. The results are shown in Table 9.

TABLE 8

| | Experimental Example 1 | Experimental Example 2 | Experimental Example 3 | Experimental Example 4 |
|---|---|---|---|---|
| Capacitance (F) | 3.7 | 3.4 | 3.9 | 4.1 |
| Internal resistance (mΩ) | 132 | 138 | 130 | 128 |
| Capacitance retention rate (%) | | | | |
| 0 h | 100 | 100 | 100 | 100 |
| 500 h | 86 | 88 | 65 | 40 |
| Internal resistance increasing rate | | | | |
| 0 h | 1.0 | 1.0 | 1.0 | 1.0 |
| 500 h | 1.5 | 1.2 | 4.0 | 6.0 |

TABLE 9

| | Experimental Example 5 | Experimental Example 6 | Experimental Example 7 | Experimental Example 8 |
|---|---|---|---|---|
| Capacitance (F) | 3.7 | 3.4 | 3.9 | 4.1 |
| Internal resistance (mΩ) | 135 | 140 | 132 | 125 |
| Capacitance retention rate (%) | | | | |
| 0 h | 100 | 100 | 100 | 100 |
| 500 h | 84 | 86 | 60 | 35 |
| Internal resistance increasing rate | | | | |
| 0 h | 1.0 | 1.0 | 1.0 | 1.0 |
| 500 h | 1.6 | 1.3 | 5.4 | 8.2 |

INDUSTRIAL APPLICABILITY

The electrolyte solution of the present invention can be used as an electrolyte solution for electrochemical devices such as electric double-layer capacitors.

The invention claimed is:

1. An electrolyte solution comprising
a mononitrile compound (I),
at least one compound (II) selected from the group consisting of dinitrile compounds and trinitrile compounds, and
a quaternary ammonium salt (III),
the amount of the compound (II) being 0.05 to 5% by mass in the electrolyte solution,
wherein the dinitrile compound is a compound represented by the following formula (II-a):

$$NC-R^2-CN \qquad (II\text{-}a)$$

wherein $R^2$ represents a C1-C8 alkylene group which may have a fluorine atom,
wherein the mononitrile compound (I) is at least one selected from the group consisting of acetonitrile and propionitrile.

2. The electrolyte solution according to claim 1,
wherein the trinitrile compound is a compound represented by the following formula (II-b):

$$NC-R^3-CX^1(CN)-R^4-CN \qquad (II\text{-}b)$$

wherein $X^1$ represents a hydrogen atom or a fluorine atom, and $R^3$ and $R^4$ may be the same as or different from each other and individually represent a C1-C5 alkylene group having a fluorine atom.

3. The electrolyte solution according to claim 1,
wherein the quaternary ammonium salt is a tetraalkyl quaternary ammonium salt or a spirobipyrrolidinium salt.

4. The electrolyte solution according to claim 1,
wherein the quaternary ammonium salt is a spirobipyrrolidinium salt.

5. The electrolyte solution according to claim 1,
wherein the amount of the quaternary ammonium salt is 0.1 to 2.5 mol/L.

6. The electrolyte solution according to claim 1,
which is intended for use in electrochemical devices.

7. The electrolyte solution according to claim 1,
which is intended for use in electric double-layer capacitors.

8. An electrochemical device comprising
the electrolyte solution according to claim 1, a positive electrode, and a negative electrode.

9. The electrochemical device according to claim 8,
which is an electric double-layer capacitor.

10. The electrochemical device according to claim 9,
wherein the electric double-layer capacitor comprises a polarizable electrode which contains activated carbon formed of a carbonized coconut shell.

* * * * *